United States Patent
Heer

(10) Patent No.: US 9,002,495 B2
(45) Date of Patent: Apr. 7, 2015

(54) OPTIMIZED CROWNING IN BEVEL GEAR WHEELS OF A BEVEL GEAR TRANSMISSION

(75) Inventor: Manfred Heer, Landkern (DE)

(73) Assignee: Schottel GmbH, Spay (DE)

( * ) Notice: Subject to any disclaimer, the term of this patent is extended or adjusted under 35 U.S.C. 154(b) by 185 days.

(21) Appl. No.: 13/640,082

(22) PCT Filed: Oct. 6, 2011

(86) PCT No.: PCT/EP2011/004984
§ 371 (c)(1),
(2), (4) Date: Nov. 1, 2012

(87) PCT Pub. No.: WO2012/055484
PCT Pub. Date: May 3, 2012

(65) Prior Publication Data
US 2013/0216321 A1    Aug. 22, 2013

(30) Foreign Application Priority Data
Oct. 29, 2010 (DE) .......................... 10 2010 049 752

(51) Int. Cl.
| | |
|---|---|
| G06F 19/00 | (2011.01) |
| B23F 9/10 | (2006.01) |
| B23Q 1/28 | (2006.01) |
| B23G 1/32 | (2006.01) |
| B23D 1/00 | (2006.01) |
| B23D 3/00 | (2006.01) |
| B23D 5/00 | (2006.01) |
| B23F 17/00 | (2006.01) |
| B23F 19/00 | (2006.01) |
| F16H 55/08 | (2006.01) |

(52) U.S. Cl.
CPC ............... *B23F 17/00* (2013.01); *B23F 19/002* (2013.01); *F16H 55/0846* (2013.01); *F16H 55/088* (2013.01); *F16H 55/0886* (2013.01)

(58) Field of Classification Search
USPC ........ 409/26–27, 64–65, 288; 700/28, 95, 97, 700/117, 159, 182
See application file for complete search history.

(56) References Cited

U.S. PATENT DOCUMENTS 5,815,400 A * 9/1998 Hirai et al. ..................... 700/173
6,050,883 A * 4/2000 Wiener ............................ 451/47

(Continued)

FOREIGN PATENT DOCUMENTS

DE      1170742 A    5/1964

*Primary Examiner* — Ronald Hartman, Jr.
(74) *Attorney, Agent, or Firm* — Andrew Wilford

(57) ABSTRACT

The invention relates to a method for producing a bevel gear wheel, in particular for rudder propellers, the teeth of which have a macro geometry specific to the gear wheels, the teeth of which can be described by flank and profile lines, the flanks of which have a tooth flank micro topography and the bearing surface of which represents the contact region of the intermeshing teeth. The crown of a tooth flank corresponds to the elevation of the tooth flank center with respect to the tooth flank edge, wherein the course of the height and width crowns of the flank surface is substantially shaped like a circular arc. By means of precise material removal, the micro topography of the tooth flank and thus the bearing surface is optimized firstly in that the material removal is carried out such that the end relief on the tooth flank surface is reduced toward the tooth heel side and the tooth toe side, an area having a greater length and width comes into engagement on the flank and thus an enlarged bearing surface is present, and secondly in that the course of the crown the crown of a tooth flank follows an approximately logarithmic, elliptical and/or an exponential curve shape, which runs through the point of contact, when the ease-off is viewed with no load, in a longitudinal section in the flank sectional surface and/or in a profile section in the profile sectional surface.

18 Claims, 7 Drawing Sheets

(56) References Cited

U.S. PATENT DOCUMENTS

| | | | |
|---|---|---|---|
| 6,390,893 B1* | 5/2002 | Stadtfeld et al. | 451/47 |
| 7,599,824 B2* | 10/2009 | Shigemi et al. | 703/7 |
| 7,627,389 B2* | 12/2009 | Muller et al. | 700/97 |
| 7,707,879 B2* | 5/2010 | Tobisawa et al. | 73/162 |
| 8,615,317 B2* | 12/2013 | Neumaier et al. | 700/97 |
| 8,903,537 B2* | 12/2014 | Neumaier et al. | 700/159 |
| 2003/0198526 A1* | 10/2003 | Colbourne | 409/1 |
| 2005/0159080 A1* | 7/2005 | Fong et al. | 451/5 |
| 2007/0125148 A1 | 6/2007 | Dohmann | |
| 2010/0111628 A1* | 5/2010 | Megens et al. | 409/26 |
| 2013/0025394 A1* | 1/2013 | Fan | 74/417 |
| 2013/0031994 A1* | 2/2013 | Dort et al. | 74/423 |

\* cited by examiner

Fig. 4  Width Camber
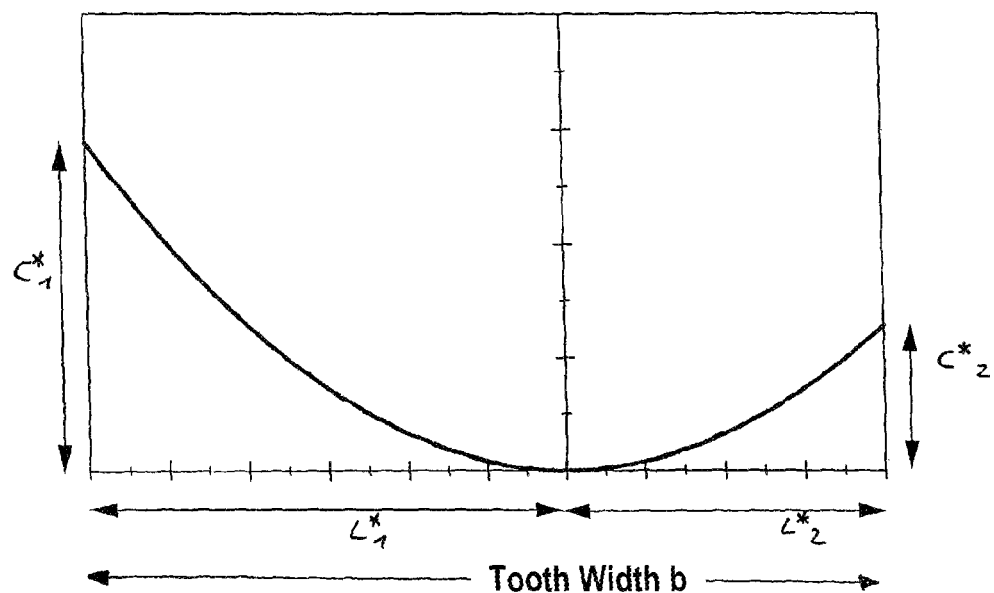
Fig. 5  Height Camber
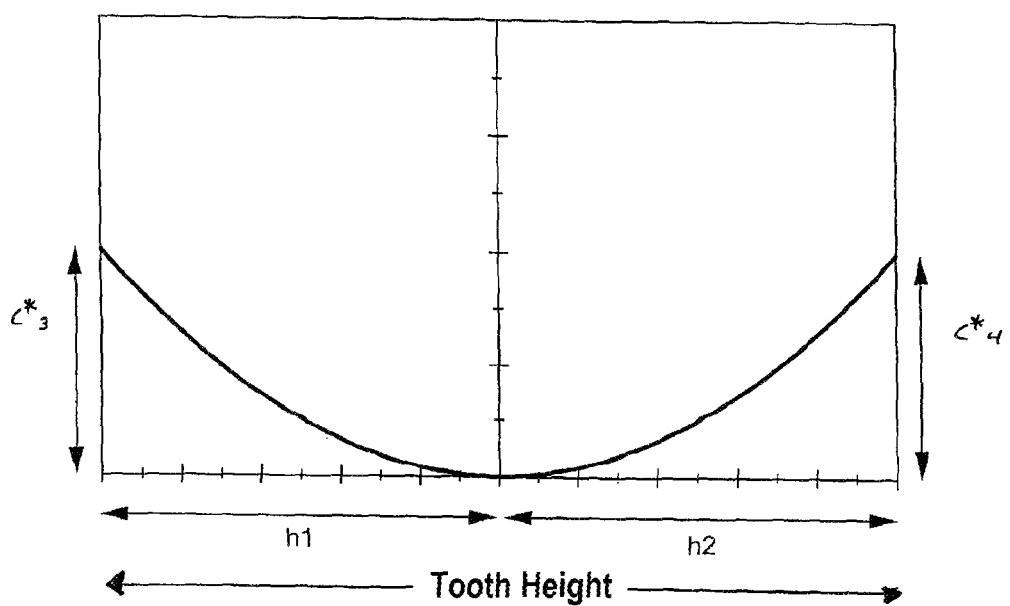

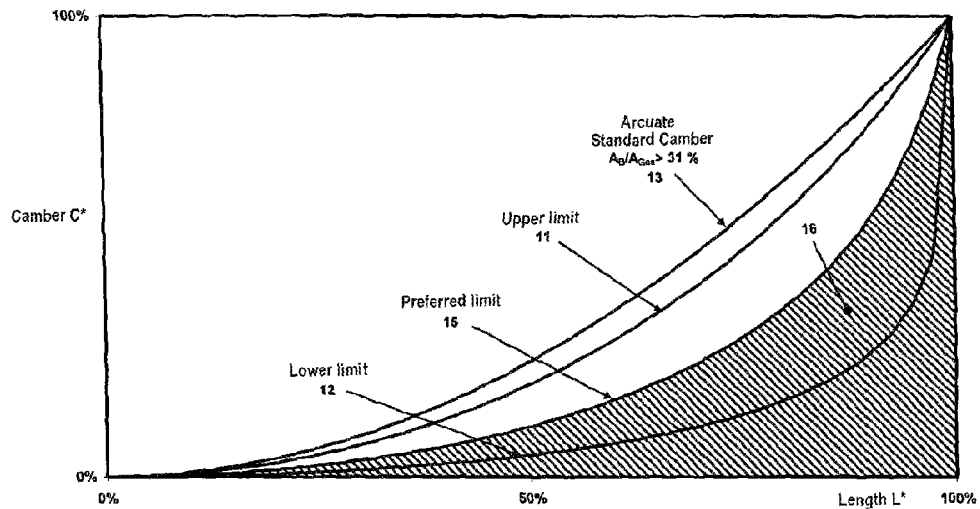
Fig. 9
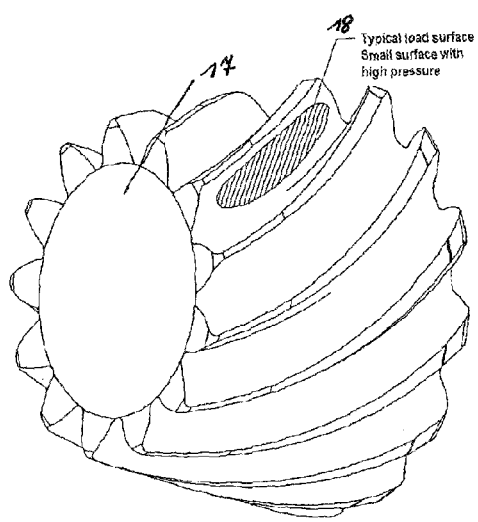
Fig. 10a - Prior Art
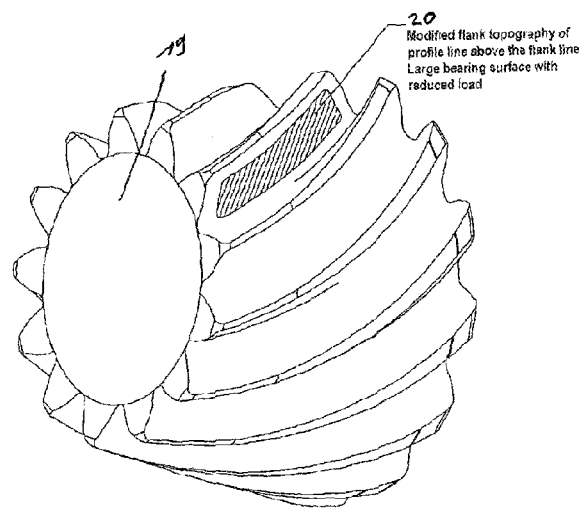
Fig. 10b

OPTIMIZED CROWNING IN BEVEL GEAR WHEELS OF A BEVEL GEAR TRANSMISSION

CROSS REFERENCE TO RELATED APPLICATIONS

This application is the US-national stage of PCT application 2011/004984 filed 6 Oct. 2011, published 3 May 2012 as WO2012/055484, and claiming the priority of German patent application 102010049752.5 itself filed 29 Oct. 2010.

The invention relates to a method of making a bevel gear, in particular for rudder propellers, having teeth that
  can be described by flank and profile lines,
  that have flanks that have a tooth flank micro topography, and
  that have a contact area that represents the contact region of the engaging teeth, a camber of a tooth flank corresponding to an elevation of a tooth flank center with respect to a tooth flank edge, a shape of the height and of the width cambers of the flank surface being substantially circular arcs.

Bevel gears serve for transmitting torques and rotational movements in rolling contact gears. The structure of a single-stage bevel-gear drive consists of crown gear and pinion. The crown gear and pinion are connected to respective shafts in a nonpositive, positive or firmly bonded manner. In extension of the shafts, the shaft axes intersect or cross. The motion sequence of two engaging bevel gears is designated as rolling. In this process, the respective tooth flanks of tooth and mating tooth engage one another.

Tooth systems in which the tooth flanks of tooth and mating tooth roll against each other in a kinematically exact manner are designated as conjugated teeth. Here, the tooth flanks touch each other in each rolling position on a line. However, in order to achieve improved shifting behavior, deviations from this shape are made by providing camber.

Thus, the tooth geometry of bevel gears generally has a camber on each tooth flank since in the case of transmitting high loads, the tooth flanks are not allowed to come into engagement over their entire width and height because if they did the excessive stress occurring at the edges would damage the teeth. Camber of a tooth flank is to be understood as elevation of the tooth flank center with respect to the tooth flank edge. Here, the engaging gears are not in full contact with each other. Between two tooth flanks, in particular in the unloaded state, there is an air gap of varying size. The spacing between two gears is also designated as ease-off or gap size.

A differentiation is made here between height and width cambers. The width camber has shape formed by decreasing the cutting circle radius or the diameter of the grinding tool. The shape of the height camber is determined by the profile of the tool in that the reference profile is superimposed with a circular camber. Other shapes are not used in practice for economic reasons.

The shape of cambers of bevel gears is usually determined by the manufacturing process. In particular in the case of the known cyclo-palloid bevel gear and the methods of finish machining used for this (HPG method/grinding), the shape of the cambers is approximately circular-arc shaped.

The gear surfaces that engage with each other under load, i.e. torque drive, are designated as contact areas. Since principally tooth and mating tooth are not fully engaged, the surface area of a contact area is always smaller than that of the entire tooth flank. The actually existing shape of the contact area can be approximately described as an ellipse.

The actually engaging regions and the prevailing spacing between a tooth and the associated mating tooth, the spacing being created by the corresponding relief on the tooth flanks, can be visualized by the so-called "ease-off" (FIG. 1). Here, the spacing created by the cambers between the pinion flank and the crown-gear flank is plotted over a plane reference surface. This surface extends over the entire flank width and height. In the ease-off illustration, the tooth flank touches the reference surface at a contact point (intersection of the two thick lines in the fine grid).

For describing the shape of the camber of a tooth flank, the associated curve is illustrated in a graph in which the ease-off or camber C is plotted over the tooth width and the tooth height. In such graphs, the length L is plotted from the contact point to the edge of the tooth flank (heel, toe, root or tip). Through standardization, the definition for L and C is independent of absolute values so that the curve applies to all common cambers and tooth widths. At the point $L^*$ (the length from the corresponding tooth flank edge), the curve reaches the value of the standardized camber $C^*$ (FIG. 2).

However, the length $L^*$ does not have to be half the tooth width, in general b, thus b/2, or half the tooth height, in general $h=2^*m$, thus h/2, because the contact point does not have to be exactly in the center of the tooth. The contact point can also be eccentrically located on the flank (FIG. 3). This results in a so-called offset contact area. In case of an offset contact area, the circular arc shifts toward an edge so that with the same radius, the spacing of the flanks at the edge no longer corresponds to the camber (FIGS. 4 and 5). The standardized camber $C^*$ thus refers to the actual spacing of the corrected flank from the uncorrected flank at the respective flank edge and does not refer to the nominal camber.

For describing a circularly arcuate "normal" camber, two features are defined.
1. Absolute Value of the Area Under the Curve (FIG. 6a)
  In case of a normal camber shape, the area $A_B$ under the curve for common standard camber (b/500 ... b/1500, or $0.003 \, m_0 ... 0.006 \, m_0$) is usually approximately 33.4%, but at least 31% of the total area $A\_Ges=L^* \times C^*$.
2. Absolute Value of the Curve at the Midpoint of the Length $L^*$ (FIG. 6b)
  At $L^*/2$, the function value of the normal camber is approximately 25% of $C^*$.

The limiting factor for torque drive is the maximum permissible surface pressure. In the case of soft teeth, the maximum permissible surface pressure is low so that producing conjugated teeth is carried out in a cost-effective manner by standard manufacturing processes. In the case of hard teeth, high surface pressures occur. If the surface pressure exceeds a permissible limit value, this results in damage to the teeth. In order to further increase torque drive and to achieve higher limit values, different approaches are pursued:
  use of stronger materials, in particular high tempered steel
  carrying out surface hardening
  producing tooth flanks with high surface finish quality Using high-temper steel is cost-intensive due to expensive raw materials and high machining costs. Machining high tempered steel products or further machining of processed surfaces in subsequent manufacturing steps is complicated and expensive due to the material hardness.

At the same time, due to the torques required to be transmitted with regard to a specific installation space, the finishing methods reach their limits in terms of material-specific permissible surface pressure.

In particular, actual tooth flank shapes do not utilize the maximally possible area of a tooth flank for power drive because the previously generated elliptical contact areas do not cover the potential usable portion of a tooth flank. Producing the maximum permissible contact area is not possible due to the previously used standard manufacturing methods.

Finally, up to now, adaptations to the tooth flank shape have been analyzed and optimized only in terms of noise reduction. Optimizations have been carried out with special purpose machines or by manufacturing individual parts.

It is an object of the invention to improve bevel gears of a bevel-gear drive of the above mentioned kind in such a manner that the bevel gears have a larger optimized contact area so they can transmit more torque.

According to the invention, this object is achieved by precise material removal a micro topography of the tooth flank and thus the contact area is optimized such that an end thickness on the tooth flank is reduced toward a tooth heel side and a tooth toe side and an area having a greater length and width comes into engagement on the tooth flank to enlarge a contact area, and when the ease-off is viewed with no load, the shape of the camber of a tooth flank, in a longitudinal section in the flank sectional surface and/or in a profile section in the profile sectional surface, follows an approximately logarithmic, elliptical or exponential curve that runs through a point of contact.

This can take place using new manufacturing methods, preferably by material-removing multi-axis manufacturing methods, in particular a five-axis milling process. In doing so, the shape of the camber of a tooth flank can be modified and thus optimized as desired. The goal here is to enlarge the total load-bearing surface area of the tooth flank and to optimize the shifting behavior at the same time. In particular in the case of hard teeth, producing an optimized selective shape of the camber using multi-axis milling machines represents a new manufacturing method.

Producing optimized camber shapes along logarithmic, elliptical or exponential curves, or a combination of the above-described shapes, enables tooth flanks on gears that can transmit higher power with the same geometrical base data and the same material parameters.

Differentiating the "new" optimized camber from the circularly arcuate "normal" camber takes place through the definition of the following two features of the curve:

1. Absolute Value of the Area Under the Curve (FIG. 8a)

Due to the rather flat shape of the curve in the center of the flank, the optimized camber achieves a ratio $A_B/A_{Ges}$=10 to 30%.

2. Absolute Value of the Curve at the Midpoint of the Length L* (FIG. 8b)

For the second feature of the new camber, the function value of the curve at the midpoint, thus at 50% of the length L*, reference data for C* for the upper limit and the lower limit are defined. For the upper limit, the reference value of 20% of the surface area of the total rectangle spanned by L* and C* is defined. For the lower limit, the reference value of 5% for C* is defined.

The two limit lines are defined as follows:

Formula for the upper limit curve (FIG. 8a)

$$f(x) = C * \frac{\log\left(1 - \left(\frac{x}{1.5 \cdot L^*}\right)^2\right)}{\log\left(1 - \left(\frac{1}{1.5}\right)^2\right)}$$

Formula of the lower limit curve (FIG. 8a)

$$f(x) = C * \frac{\log\left(1 - \left(\frac{x}{1.001 \cdot L^*}\right)^2\right)}{\log\left(1 - \left(\frac{1}{1.001}\right)^2\right)}$$

The upper and the lower limit lines enclose a region for the optimized tooth flank shape (FIGS. 8a, 8b and 9). In this region, the preferred optimized shapes of the tooth flank shape of the teeth extend in dependence on the criteria that influence the shapes of stress in the tooth and on the tooth surface under load. These criteria are mainly determined by design specifications and are not relevant because their consideration or selection depends on the specific application.

The advantage of such tooth flanks of bevel gears is a maximized potential for transmitting torques.

Particularly advantageous here is the reduced amount of material that has to be removed (material removal) from the individual teeth after rough machining.

It is an advantage that a more uniformly distributed load on the teeth occurs along the tooth flanks. This results in a reduced local peak load at critical points of the tooth and thus increases the service life.

It is also of advantage that an enlarged contact area has a larger rolling surface. Thus, under load, a lower surface pressure at constant load is achieved, which reduces abrasion on the contact surface. This reduces wear and thus increases the tool life of a drive. Thus, at the same time, longer maintenance intervals can be planned, which is important not only in the field of rudder propeller drives.

Also, particularly advantageous is here that the previously known methods used in production for maximizing the torque drive capacity of a tooth and the material pairings preferably used can be combined with the new idea presented here.

Hereafter, an illustrated embodiment is illustrated by the drawings:

FIG. 4 illustrates the width camber along a tooth width.

FIG. 5 illustrates the height camber along the tooth height.

FIG. 9 compares the different shapes of the camber.

FIG. 10a illustrates a bevel gear in which the contact area of a surface extending with a "normal" circularly arcuate camber with high surface pressure is marked.

FIG. 10b illustrates a bevel gear for which the flank topography of the gear flank has been optimized and thus has a larger contact area.

Since from an inventive point of view, the following considerations on camber are identical for height and width cambers, in general, the term camber is used. If necessary, a distinction is made in particular between width and height camber where applicable.

Figure 1:
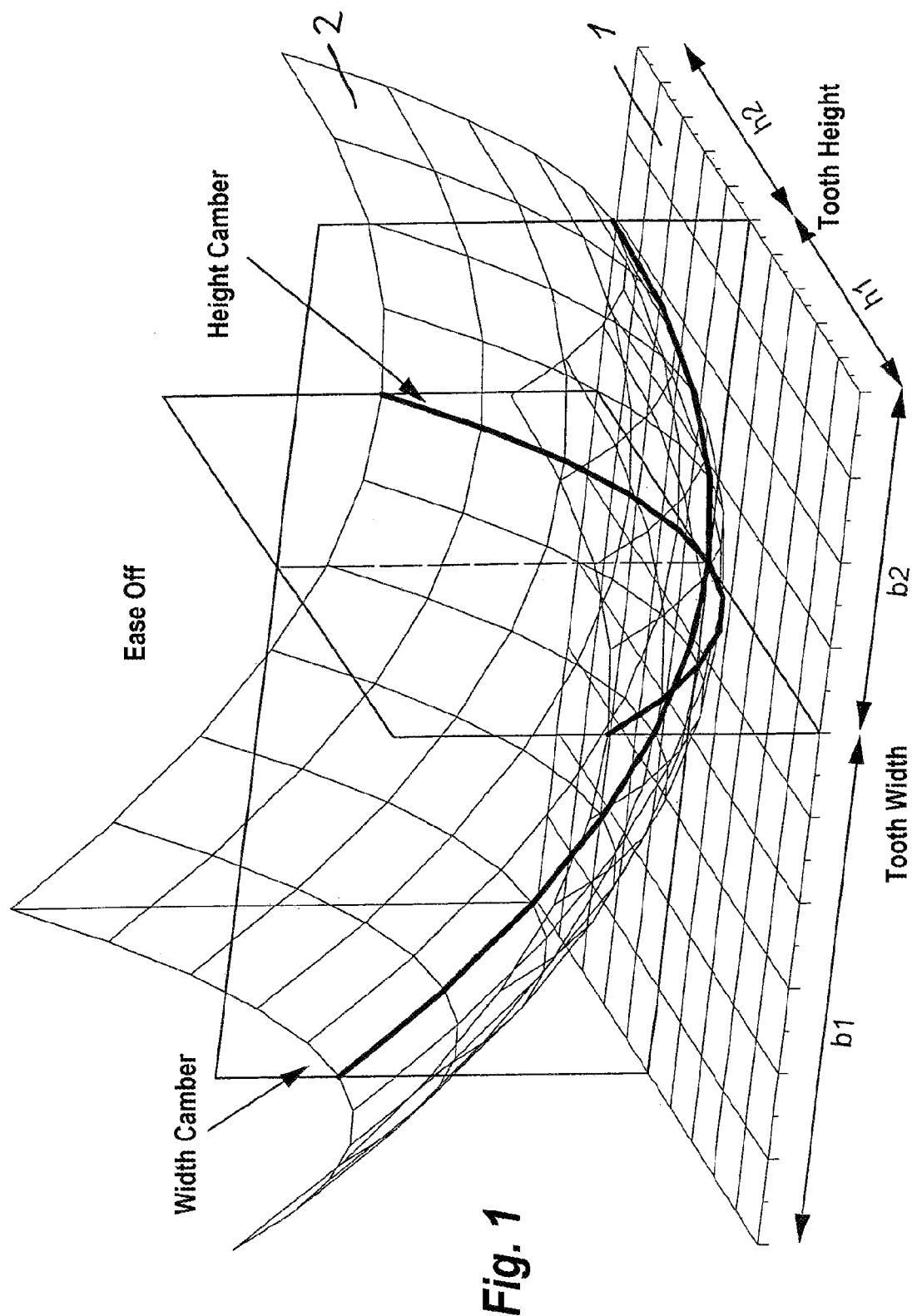
FIG. 1 shows the "ease-off" of two engaging gears.

FIG. 1 shows the "ease-off" illustration in which two tooth flanks engaging with one another without load are shown. The first tooth flank 1 is here a plane. The second tooth flank 2 thus represents an elevated curved tooth flank. This way, the value for the gap size or ease-off between the two opposing points of two tooth flanks is made visible. This 3D illustration shows the spacings between the two tooth flanks can be measured. FIG. 1 shows corresponding shapes of width cambers and height cambers along a 3D raster. Here, FIG. 1 shows an offset contact area, i.e. the point of contact between the two tooth flanks is not centered at the midpoint along the tooth width and the tooth height, but is offset along the tooth width. This is apparent from the different lengths b1 and b2 along the tooth width.

Figure 2:
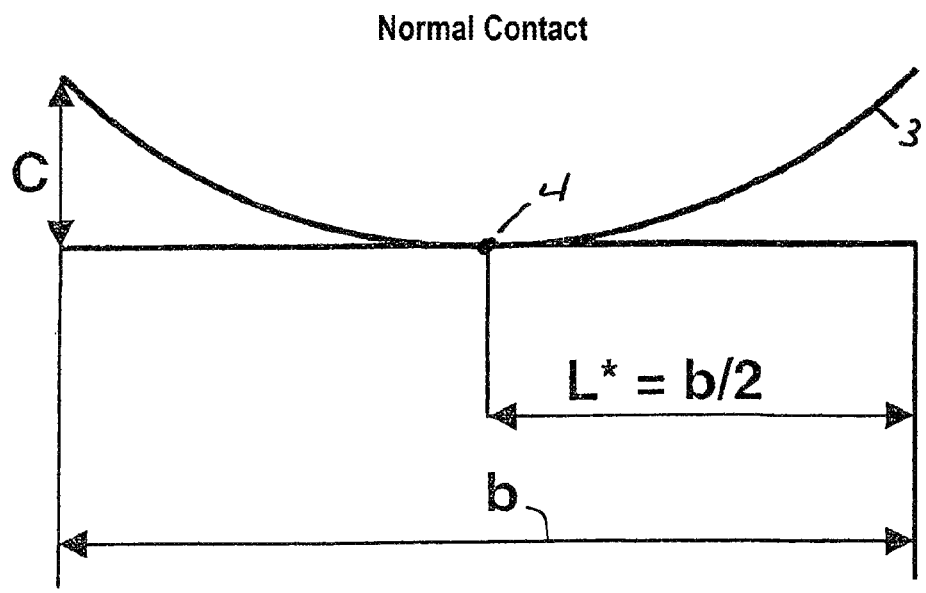
FIG. 2 shows a normal contact area with regard to the tooth flank.

FIG. 2 shows in general a shape of a camber 3 along the tooth width b and the point of contact 4 of an exemplary contact area having an exemplary reference area. This shape is an exemplary cut-out from a 3D "ease-off" illustration. The point of contact lies in L*, which is the center of the tooth flank width b/2. C represents the gap size or ease-off.

Figure 3:
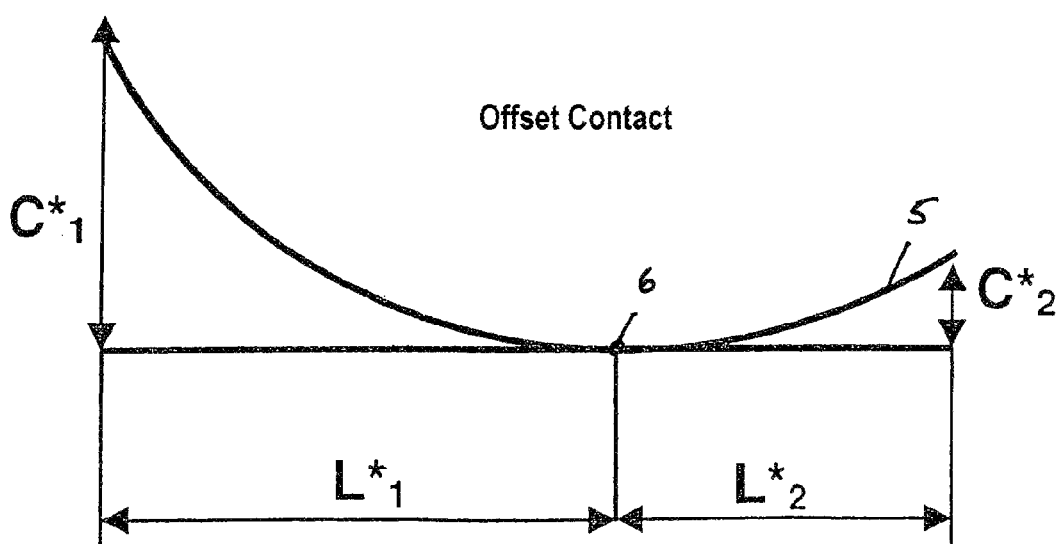
FIG. 3 shows a contact area offset along the tooth width b.

FIG. 3, like FIG. 2, shows the shape of the camber 5, but here with an offset contact area that is offset along the tooth width b. The position of the contact point or point of contact 6 of the plane tooth flank and the opposing tooth flank is indicated by the variables $L^*_1$ and $L^*_2$. Due to offset contact area, there is a greater ease-off $C^*_1$ on the left front side of the gear, whereas on the right side of the gear, there is a smaller ease-off $C^*_2$.

FIG. 4 illustrates, in particular with a 2D cut-out from a 3D "ease-off" illustration of FIG. 1, the width camber along the tooth width b with an offset contact area of a tooth flank. Compared with the ease-off $C^*_2$, the ease-off $C^*_1$ is twice as large.

FIG. 5 shows the height camber of a tooth flank with the respective ease-offs $C^*_3$ and $C^*_4$. Here, the height camber is symmetrical (as is apparent from the identical lengths of h1 and h2). However, asymmetrical height cambers can also be employed.

Figure 6A:
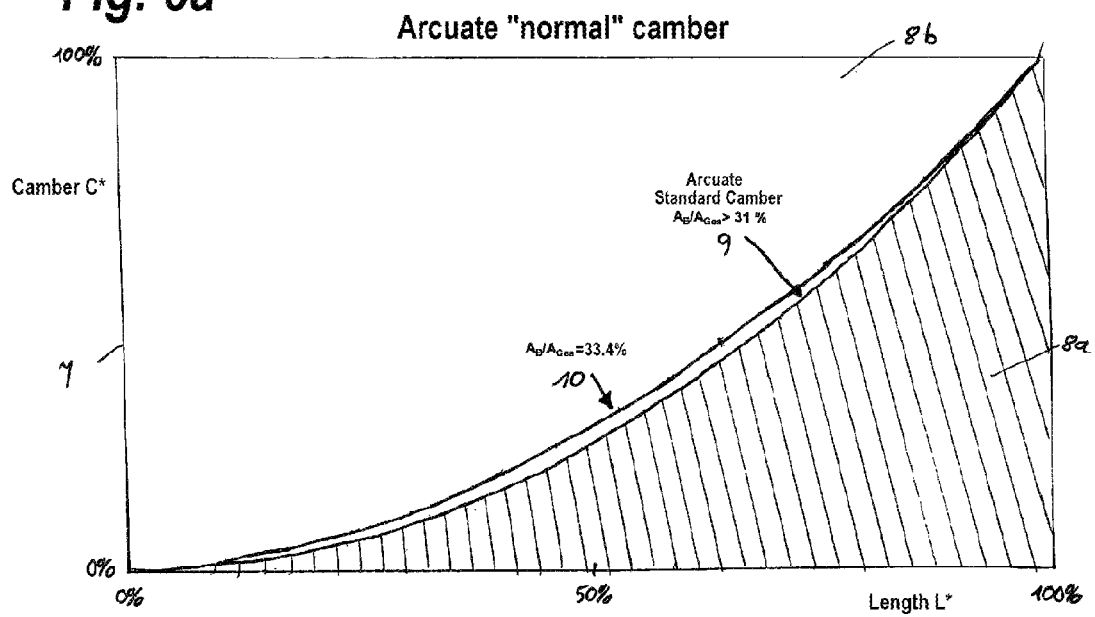
FIG. 6a illustrates the circularly arcuate normal camber, thus the shape with respect to the camber C*.

FIG. 6a describes the shape of the tooth flank crown for "normal" circularly arcuate cambers that are also called standard cambers. Here, the abscissa and the ordinate span a rectangle having the area $A_{Ges}$ 7. The general rule for standard cambers is that with regard to the area $A_{Ges}$ 7, the area $A_B$ 8a is larger by 31%. The remaining area 8b above the curve of the circularly arcuate standard cambers represents the elevated tooth of the ease-off illustration. The hatched area 8a below the lower limit curve 9 for the circularly arcuate camber shows the area that is removed, e.g. by machining, during the manufacture of the gear. Here, the width cambers for these "normal" circularly arcuate camber shapes are within a value range of from b/500 to b/1500, and the height cambers are in a value range of from 0.003 $m_0$ to 0.006 $m_0$. The curve indicated by $A_b$ divided by $A_{Ges}$ equal 33.4% surface area shows one of the possible circular standard curves commonly used up to now.

Figure 6B:
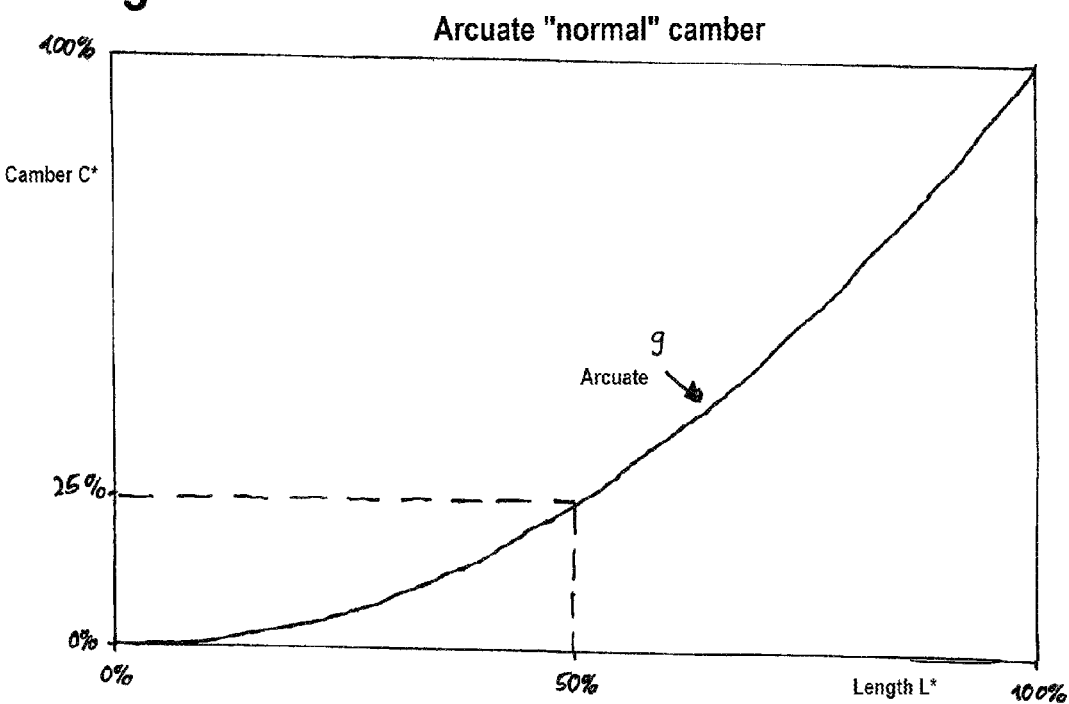
FIG. 6b illustrates for a "normal" circularly arcuate camber a corresponding reference point.

FIG. 6b shows for a "normal" circularly arcuate camber shape the corresponding proportional reference point for C*=25% at the length shape L*=50%.

Figure 7A:
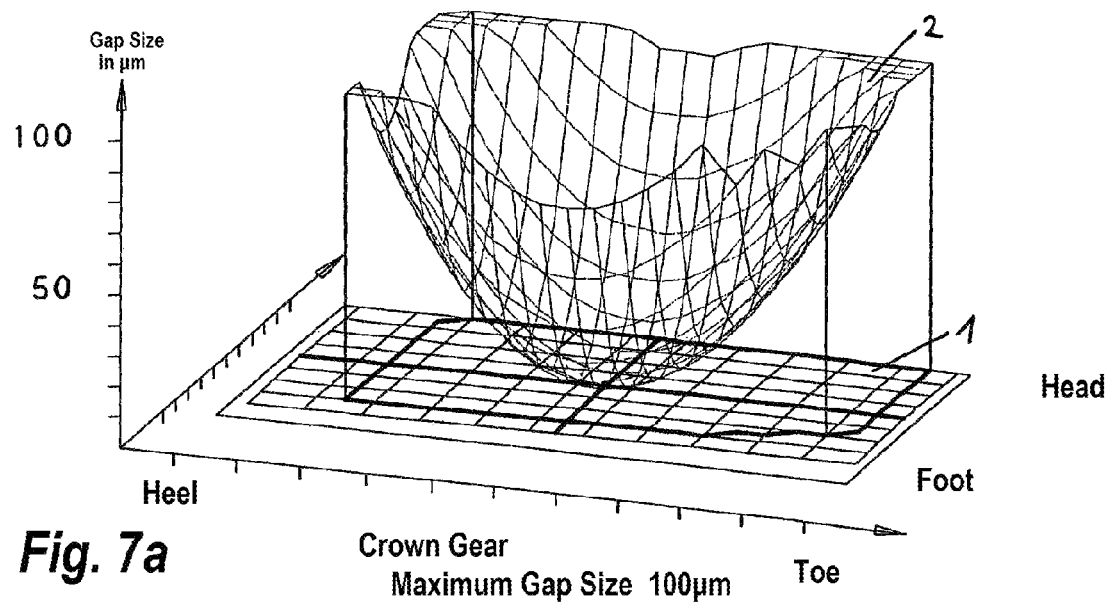
FIGS. 7a and 7b illustrate in an ease-off illustration the "normal" circularly arcuate shape of the camber in contrast to the shape of the camber of the optimized tooth flank.

FIG. 7a illustrates the 3D "ease-off" view for a circularly arcuate camber.

Figure 7B:
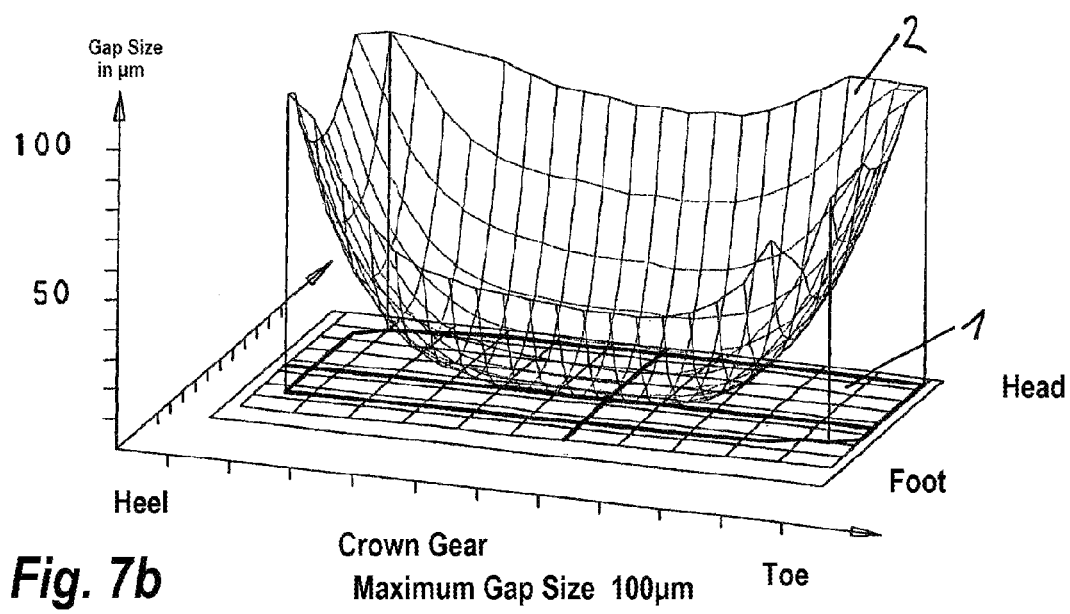

FIG. 7b is compared with FIG. 7b and illustrates the 3D "ease-off" view of the new optimized contact area. Here, the differently sized ease-offs between the tooth flank 1 formed into a plane and the elevated and curved tooth flank 2 are visible. It is also apparent from the comparison that in the case of the optimized tooth flank shape, less material has to be removed.

Figure 8A:
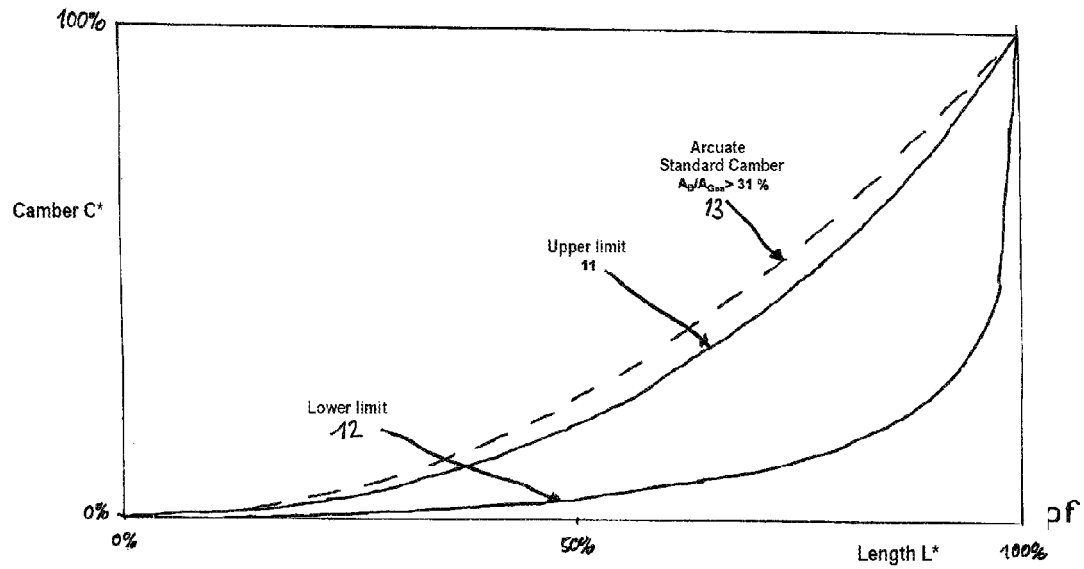
FIG. 8a illustrates for the optimized camber the limits and the region for the preferred shape.

FIG. 8a describes the shapes of the upper limit 11 and the lower limit 12 for the shapes of an optimized enlarged contact area. These limits enclose the region in which the preferred shapes of an optimized contact area are defined. It is clearly shown that the upper limit of the optimized contact areas runs significantly below the limit curve 13 that limits the lower limit of the "normal" circularly arcuate standard camber.

Figure 8B:
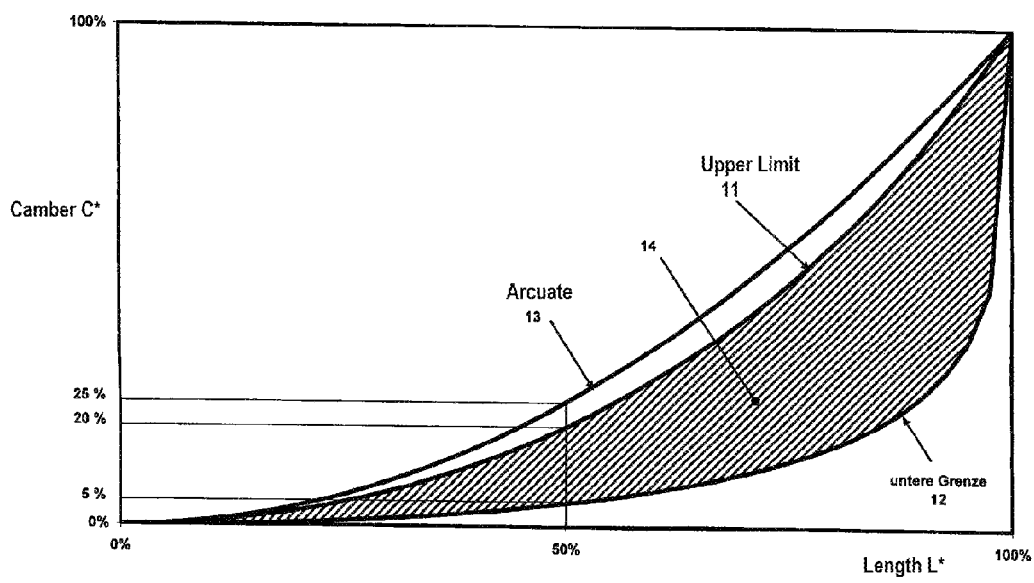
FIG. 8b illustrates for the optimized camber the reference points for the upper and lower limit curves.

FIG. 8b describes as percentages the reference points of the camber shapes along the tooth flank width and compares here the lower limit curve 13 for "normal" circularly arcuate cambers with the region 14 for optimized cambers. At 50% of the shape along the tooth width L*, the reference points for the upper limit curve are at 20% and at 5% for the lower limit curve.

FIG. 9 compares the different previously viewed curves with each other. These are:
the "normal" circularly arcuate standard camber 13 that generally is $A_B/A_{Ges} > 31\%$;
the upper limit 12 of the optimized camber;
the lower limit 11 of the optimized camber;
a preferred correction curve 15 for the tooth flank shape of a special gear, which correction curve runs is between the upper and the lower limits for optimized cambers.

Below the preferred correction curve, an area 16 is highlighted by hatching. This area represents the region that has to be removed by appropriately used manufacturing methods, e.g. by milling. The comparison with the standard camber shows clearly that in the case of the optimized tooth flank shape, starting with the blank of the bevel gear, considerably less material has to be removed than in the case of the circular standard camber.

FIG. 10a illustrates a whole bevel gear 17 that has typical circularly arcuate cambers. Shown here is the load-bearing surface 18; the graphics further illustrates a small load-bearing surface subjected to high pressure that is typical for the use of high tempered gears. The elliptical shape of this surface is clearly shown.

FIG. 10b illustrates a gear 19 with changed flank topography. Due to the optimized enlarged contact area, this gear has a changed contact surface 20. This contact surface can be described as a rectangle having rounded corners.

The invention claimed is:

1. A method of making a bevel gear having teeth that are described by flank and profile lines, the flank having a tooth flank micro topography and having a contact area that represents a contact region of engaging teeth, wherein a camber of a tooth flank corresponding to an elevation of a tooth flank center, with respect to a tooth flank edge, is characterized in that by precise material removal, a micro topography of the tooth flank, and thus the contact area, is optimized such that an end thickness on the tooth flank is reduced toward a tooth heel side and a tooth toe side and an area having a greater length and width comes into engagement on the tooth flank to enlarge a contact area, wherein when an ease-off is viewed with no load, the shape of the camber of a tooth flank, in a longitudinal section of a flank sectional surface and/or in a profile section of a flank sectional surface follows an approximately logarithmic, elliptical or exponential curve that runs through a point of contact, wherein a milling cutter follows a machining curve that is superimposed with a correction curve to generate an optimized load-bearing contact area and forms the profile lines and/or the flank lines along an entire tooth width and tooth height of the logarithmic, elliptical or exponential correction curve, wherein the correction curve lies between an upper and lower limit curve, the teeth being designed as a helical or spiral tooth system.

2. The method defined in claim 1, wherein a flank shape, in a flank sectional surface, divides the flank sectional surface into an area intersecting a tooth and a remaining area, and a size of the remaining area is 10% to 30%, preferably 20% to 28% of a total area, wherein a flank sectional surface is a surface that, when the ease-off is viewed with no load in a longitudinal direction of the tooth, runs through a point of contact between a tooth and a mating tooth, thereby extending perpendicular to a reference surface that is formed by a flank of the mating tooth, the flank of the mating tooth forming a plane surface.

3. The method defined in claim 2, wherein a total surface of the flank sectional surface, in the case of an offset contact area, is spanned by an absolute value of the ease-off and a distance from the point of contact up to a tooth flank end.

4. The method defined in claim 1, wherein the flank shape in the flank sectional surface divides the flank sectional surface into an area intersecting a tooth and a remaining area, wherein the size of the remaining area is defined as integral between a point of contact and a tooth flank end.

5. The method defined in claim 1, wherein controlling a precisely material-removing tool, in particular a milling head of the milling cutter, is carried out by a program that results in logarithmic, elliptical or exponential flank and/or profile line that is shaped similarly to the ones in the longitudinal section and/or profile section in the point of contact.

6. The method defined in claim 1, wherein a lower limit curve, with a remaining area of 10%, used during a correction so as to generate a optimized load-bearing contact area is defined as follows:

$$f(x) = C * \frac{\log\left(1 - \left(\frac{x}{1.001 \cdot L^*}\right)^2\right)}{\log\left(1 - \left(\frac{1}{1.001}\right)^2\right)}.$$

wherein L* represents a length from a corresponding tooth flank edge, and C* represents a standardized camber.

7. The method defined in claim 1, wherein an upper limit curve, with a remaining area of 30%, used during a correction so as to generate a optimized load-bearing contact area is defined as follows:

$$f(x) = C * \frac{\log\left(1 - \left(\frac{x}{1.5 \cdot L^*}\right)^2\right)}{\log\left(1 - \left(\frac{1}{1.5}\right)^2\right)}.$$

wherein L* represents a length from a corresponding tooth flank edge, and C* represents a standardized camber.

8. The method defined in claim 1, wherein the milling cutter machines two flanks touching each other, wherein the machining follows a macro geometry curve that corresponds to a non-optimized tooth shape that is superimposed by a correction curve that generates the micro topography with an optimized ease-off of the tooth flanks that are engaging each other.

9. The method defined in claim 1, wherein during a manufacturing process, conjugated teeth of the bevel gear are first produced by machine tools, then subsequently and simultaneously, in a region of the macro topography, a basic shape of the tooth flank of the bevel gear is produced, and in the region of the micro topography, a special shape of the camber for an optimized ease-off is produced.

10. The method defined in claim 1, wherein the contact area is offset in such a manner that a center of a rolling surface is offset from a center of the tooth flank.

11. The method defined in claim 1, wherein a load-bearing contact area has a mostly quadrilateral, in particular, rectangular shape with rounded corners.

12. The method defined in claim 11, wherein in terms of engagement size, the quadrilateral or rectangular load-bearing contact area having rounded corners corresponds at least to the size of a substantially elliptical load-bearing contact area.

13. The method defined in claim 1, wherein for hard-finish machining, in particular, after hardening teeth of the bevel gear, instead of lapping the contact surfaces, smooth contact surfaces of a load-bearing contact area are produced by precise material removal at the tooth flanks by milling or grinding using a four-axis or multi-axis method.

14. The method defined in claim 1, wherein the method is used for producing ship propulsion drives, in particular rudder propeller drives, preferably as underwater drive of the pod propulsion.

15. The method defined in claim 1, wherein the method is used to manufacture a boat drive, in particular, a propeller drive for a submarine or gondola.

16. The method defined in claim 1, wherein the method is used for producing ship propulsion drives in a power spectrum ranging from 100 kW to 10,000 kW.

17. The method defined in claim 1, wherein, for producing bevel gears of a bevel-gear drive, a contour of the bevel gears along the tooth flank corresponds approximately to a circularly arcuate, epicycloid or involute curve.

18. The method defined in claim 1, wherein a shape of a height and width of cambers of the flank surface is substantially circularly arcuate.

* * * * *